(12) United States Patent
Duncan et al.

(10) Patent No.: US 11,841,105 B2
(45) Date of Patent: Dec. 12, 2023

(54) SYSTEMS AND METHODS FOR MAINTAINING STRUCTURES

(71) Applicant: General Electric Company, Schenectady, NY (US)

(72) Inventors: Alexander Kyle Duncan, Niskayuna, NY (US); Todd William Danko, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/590,556

(22) Filed: Feb. 1, 2022

(65) Prior Publication Data
US 2023/0243457 A1 Aug. 3, 2023

(51) Int. Cl.
| F16L 55/18 | (2006.01) |
| F16L 55/32 | (2006.01) |
| F16L 101/10 | (2006.01) |
| F16L 101/30 | (2006.01) |

(52) U.S. Cl.
CPC ............... *F16L 55/32* (2013.01); *F16L 55/18* (2013.01); *F16L 2101/10* (2013.01); *F16L 2101/30* (2013.01)

(58) Field of Classification Search
CPC ....... F16L 55/32; F16L 55/18; F16L 2101/10; F16L 2101/30
USPC ........................ 138/97; 15/104.05; 405/184.3
See application file for complete search history.

(56) References Cited

U.S. PATENT DOCUMENTS

| 4,475,260 | A | * | 10/1984 | Beck ...................... B08B 9/051 |
| | | | | 15/104.31 |
| 4,551,061 | A | | 11/1985 | Olenick |
| 4,654,702 | A | | 3/1987 | Tolino et al. |
| 4,785,512 | A | | 11/1988 | Sigel |
| 4,862,808 | A | | 9/1989 | Hedgcoxe et al. |
| 4,986,314 | A | * | 1/1991 | Himmler ............. F16L 55/1645 |
| | | | | 166/55.7 |
| 5,355,063 | A | | 10/1994 | Boone et al. |

(Continued)

OTHER PUBLICATIONS

Chen et al., "Compound Locomotion Control System Combining Crawling and Walking for Multi-Crawler Multi-Arm Robot to adapt Unstructured and Unknown Terrain", RoboMech Journal, vol. 5, Article No. 2, Jan. 15, 2018.

*Primary Examiner* — James F Hook
(74) *Attorney, Agent, or Firm* — Armstrong Teasdale LLP

(57) ABSTRACT

A motorized apparatus includes a body assembly and a maintenance device mounted to the body assembly. The maintenance device is configured to perform a service operation on a surface. The maintenance device extends from the body assembly at an angle. The motorized apparatus also includes a plurality of leg assemblies coupled to the body assembly and configured to support the body assembly and the maintenance device at a distance from the surface. The motorized apparatus further includes at least one actuator assembly coupled to the plurality of leg assemblies and configured to independently actuate each leg assembly of the plurality of leg assemblies. The at least one actuator assembly is configured to receive instructions related to a position of the maintenance device and actuate the plurality of leg assemblies to adjust an orientation of the body assembly and the maintenance device relative to the surface.

20 Claims, 6 Drawing Sheets

(56) References Cited

U.S. PATENT DOCUMENTS

| | | | |
|---|---|---|---|
| 7,505,063 B1* | 3/2009 | Bastedo | B08B 9/043 |
| | | | 348/84 |
| 7,812,328 B2* | 10/2010 | Betz | B01J 19/123 |
| | | | 250/493.1 |
| 7,845,440 B2 | 12/2010 | Jacobsen | |
| 8,632,294 B2 | 1/2014 | Subotincic | |
| 8,977,398 B2 | 3/2015 | Jacobsen et al. | |
| 11,560,977 B2* | 1/2023 | Duncan | F16L 55/34 |
| 2003/0039752 A1* | 2/2003 | Winiewicz | B05B 13/0636 |
| | | | 427/427.2 |
| 2021/0025533 A1 | 1/2021 | Duncan et al. | |
| 2021/0025534 A1 | 1/2021 | Duncan et al. | |
| 2021/0025535 A1 | 1/2021 | Duncan et al. | |
| 2021/0025536 A1 | 1/2021 | Duncan et al. | |

* cited by examiner

SYSTEMS AND METHODS FOR MAINTAINING STRUCTURES

STATEMENT REGARDING FEDERALLY SPONSORED RESEARCH AND DEVELOPMENT

This invention was made with Government support under contract number DE-AR0001328 awarded by the Advanced Research Projects Agency-Energy (ARPA-E). The Government has certain rights in this invention.

BACKGROUND

The field of the disclosure relates to maintenance of structures, and more particularly to systems including motorized apparatus configured to position a maintenance device using a plurality of legs.

Motorized apparatus may be used to access difficult to reach locations and perform inspection and/or a repair operations on a structure. In some cases, the motorized apparatus may travel a relatively large distance from a base station to a repair site, while navigating through complex layouts. For example, a motorized apparatus may drive around obstacles on a factory floor to reach one or more repair sites on a structure. Additionally, a motorized apparatus may travel within a pipe to an inspection or repair site within the pipe. Pipes may extend over relatively large distances and have various obstacles, including bends, branches, corners, etc. The base station, located remotely from the repair or inspection site, typically includes a controller, a power source, and a reservoir of material for the motorized apparatus.

In at least some known systems, the motorized apparatus includes a maintenance device that is used to perform a service operation at the target location. Typically, the maintenance device must be positioned in a desired orientation relative to a surface to perform the service operation. Accordingly, at least some known maintenance devices include a head and one or more actuators that are coupled directly to the head to position the head relative to the surface. However, the actuators increase the cost to assemble and maintain the motorized apparatus. In addition, the actuators, drive systems, and other operable components increase the complexity and difficulty of operating the motorized apparatus. In addition, the head might not maintain a desired orientation using the actuators. For example, the motorized apparatus and/or the maintenance device may shift or move during the service operation which can cause the head to move out of position.

Accordingly, it is desirable to provide a system including a motorized apparatus configured to position a maintenance device and maintain the maintenance device in a desired orientation using a plurality of legs.

BRIEF DESCRIPTION

In one aspect, a motorized apparatus includes a body assembly and a maintenance device mounted to the body assembly. The maintenance device is configured to perform a service operation on a surface. The maintenance device extends from the body assembly at an angle. The motorized apparatus also includes a plurality of leg assemblies coupled to the body assembly and configured to support the body assembly and the maintenance device at a distance from the surface. The motorized apparatus further includes at least one actuator assembly coupled to the plurality of leg assemblies and configured to independently actuate each leg assembly of the plurality of leg assemblies. The at least one actuator assembly is configured to receive instructions related to a position of the maintenance device and actuate the plurality of leg assemblies to adjust an orientation of the body assembly and the maintenance device relative to the surface.

In another aspect, a system includes a motorized apparatus including a body assembly and a maintenance device mounted to the body assembly. The maintenance device is configured to perform a service operation on a surface. The motorized apparatus also includes a plurality of leg assemblies coupled to the body assembly and configured to support the body assembly and the maintenance device at a distance from the surface. The motorized apparatus further includes at least one actuator assembly coupled to the plurality of leg assemblies and configured to independently actuate each leg assembly of the plurality of leg assemblies. The system includes at least one sensor configured to detect a position of the motorized apparatus relative to the surface. The system further includes a controller communicatively coupled to the motorized apparatus and configured to receive information from the at least one sensor relating to the position of the maintenance device relative to the surface. The controller is configured to send instructions to the at least one actuator assembly to actuate the plurality of leg assemblies and adjust an orientation of the body assembly and the maintenance device relative to the surface.

In yet another aspect, a method for performing a service operation on a surface includes positioning a motorized apparatus at a target location. The motorized apparatus includes a body assembly and a maintenance device mounted to the body assembly and configured to perform a service operation at the target location on the surface. The motorized apparatus also includes a plurality of leg assemblies coupled to the body assembly and configured to support the body assembly and the maintenance device at a distance from the surface. The motorized apparatus further includes at least one actuator assembly coupled to the plurality of leg assemblies and configured to independently actuate each leg assembly of the plurality of leg assemblies. The method also includes positioning, using at least one actuator assembly, each leg assembly of the plurality of leg assemblies relative to the body assembly to adjust an orientation of the body assembly and the maintenance device relative to the surface. The method further includes performing, using the maintenance device, the service operation on the surface when the body assembly and the maintenance device are positioned in a desired orientation relative to the surface.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
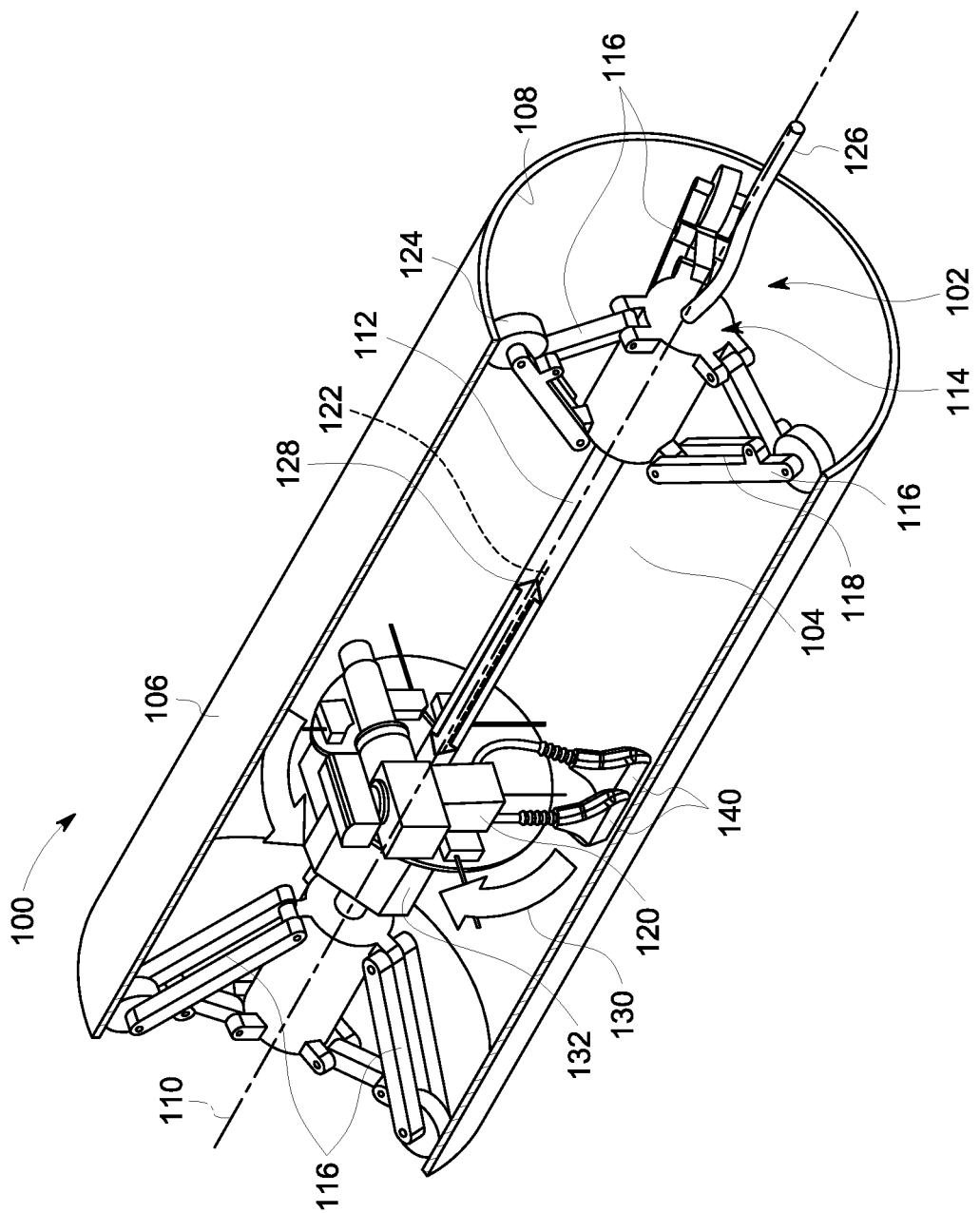
FIG. 1 is a perspective view of a portion of a pipe with a motorized apparatus traveling through an interior cavity of the pipe.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a system for inspecting and/or repairing structures. The system includes a multi-legged independently actuated motorized apparatus for delivering inspection and repair tools to difficult to access locations. Mechanical separation and independent control of each leg enables an operator to control a radial position and axial pitch of the motorized apparatus and the tool mounted to a body assembly of the motorized apparatus. The independently actuated, antagonistically positioned legs are used to position the tool and maintain the tool in a precise position and orientation during a service operation. The motorized apparatus is simpler to assemble and operate because actuator assemblies for the legs are used to position the tool. The motorized apparatus does not require separate actuators for the tool.

Figure 2:
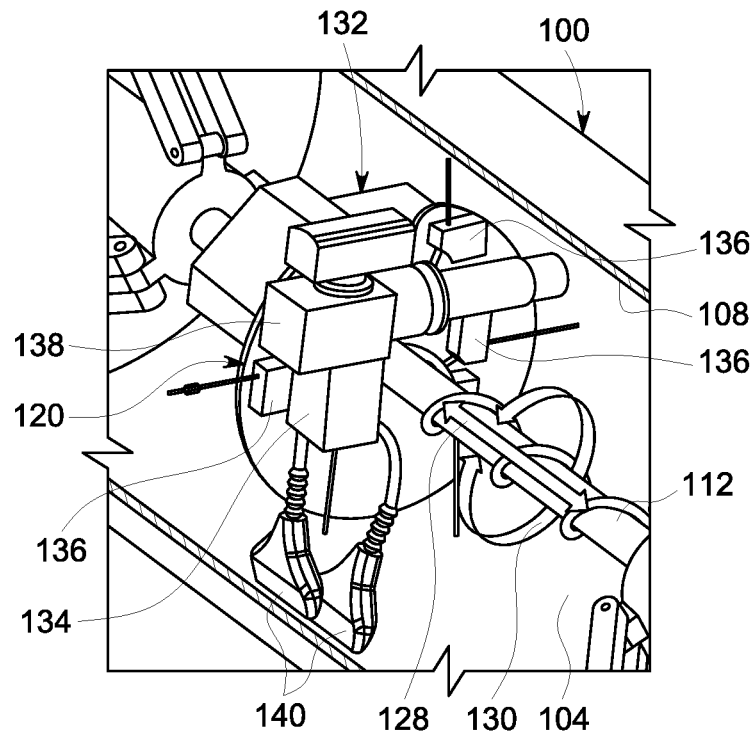
FIG. 2 is an enlarged view of a portion of the motorized apparatus shown in FIG. 1, the motorized apparatus located within the interior cavity of the pipe shown in FIG. 1 and including a maintenance device.

FIG. 1 is a schematic view of a portion of a pipe 100 with a motorized apparatus 102 traveling through an interior cavity 104 of pipe 100. FIG. 2 is an enlarged view of a portion of motorized apparatus 102 located within interior cavity 104 of pipe 100. In the example embodiment, pipe 100 includes a sidewall 106 having an interior surface 108 extending around a central axis 110 and defining interior cavity 104. Pipe 100 is cylindrical and has diameter in a range of about 6 inches to about 36 inches or about 12 inches to about 36 inches. In some embodiments, pipe 100 has a length of at least 500 feet. In alternative embodiments, pipe 100 may be any shape and/or size.

Also, in the example embodiment, motorized apparatus 102 is configured to travel through interior cavity 104 of pipe 100 along a length of pipe 100. For example, in some embodiments, motorized apparatus 102 is configured to fit within interior cavity 104 and travel at least 500 feet along the length of pipe 100. Accordingly, motorized apparatus 102 facilitates inspection and repair of pipe 100 within interior cavity 104 at locations that are inaccessible from an exterior of pipe 100. Moreover, motorized apparatus 102 is self-propelled, meaning that motorized apparatus 102 moves within interior cavity 104 without an external force acting on motorized apparatus 102.

Motorized apparatus 102 includes a body assembly 112 sized to fit within interior cavity 104, at least one drive system 114, a plurality of leg assemblies 116, at least one actuator assembly 118, and a maintenance device 120. Body assembly 112 of motorized apparatus 102 includes a longitudinal axis 122. Each drive system 114 is coupled to one of leg assemblies 116 and is configured to move body assembly 112 relative to pipe 100. For example, each drive system 114 includes a plurality of drive mechanisms such as wheels 124, and a motor (not shown) drivingly coupled to wheels 124. A power source, such as a battery, provides power for operation of the motor. In some embodiments, power is provided via a tether 126. During operation, the motor induces rotation of wheels 124 relative to body assembly 112. Motorized apparatus 102 moves along surface 108 as wheels 124 rotate in contact with surface 108. In alternative embodiments, motorized apparatus 102 includes any drive system 114 that enables motorized apparatus 102 to operate as described. For example, in some embodiments, drive system 114 includes a drive mechanism other than wheels 124, such as treads, tracks, worms, legs, and/or electromagnetic or fluidic locomotion mechanisms.

During operation, motorized apparatus 102 enters interior cavity 104 of pipe 100 from an opening or access hatch. Motorized apparatus 102 travels in a travel direction 128. In some embodiments, motorized apparatus 102 traverses transitions in pipe 100 such as bends or size transitions. When motorized apparatus 102 reaches a target location, motorized apparatus 102 goes into a parked mode and a maintenance device 120 of motorized apparatus 102 is positioned relative to a surface to perform a maintenance and/or repair operation. For example, leg assemblies 116 are used to position maintenance device 120 in a desired orientation to perform the maintenance and/or repair operation. Actuator assemblies 118 are coupled to leg assemblies 116 and configured to independently actuate each leg assembly 116.

As motorized apparatus 102 travels through interior cavity 104, motorized apparatus 102 may be used to inspect and/or repair any interior components of pipe 100. For example, in some embodiments, motorized apparatus 102 is used to generate an image of interior surface 108 and the image is examined to determine whether repairs are necessary. If repairs are necessary, motorized apparatus 102 can be used to repair interior surface 108. For example, in some embodiments, motorized apparatus 102 patches a portion of interior surface 108. Interior surface 108 may be any surface within interior cavity 104 of pipe 100.

FIG. 2 is an enlarged perspective view of maintenance device 120 of motorized apparatus 102. In the example embodiment, maintenance device 120 is coupled to body assembly 112 and extends from body assembly 112 at an angle. In some embodiments, maintenance device 120 is movable relative to body assembly 112. For example, maintenance device 120 can move translationally in travel direction 128 along body assembly 112 as well as rotate in a rotation direction 130 about body assembly 112, offering maintenance device 120 a field of regard covering interior cavity 104 of pipe 100.

Figure 6:
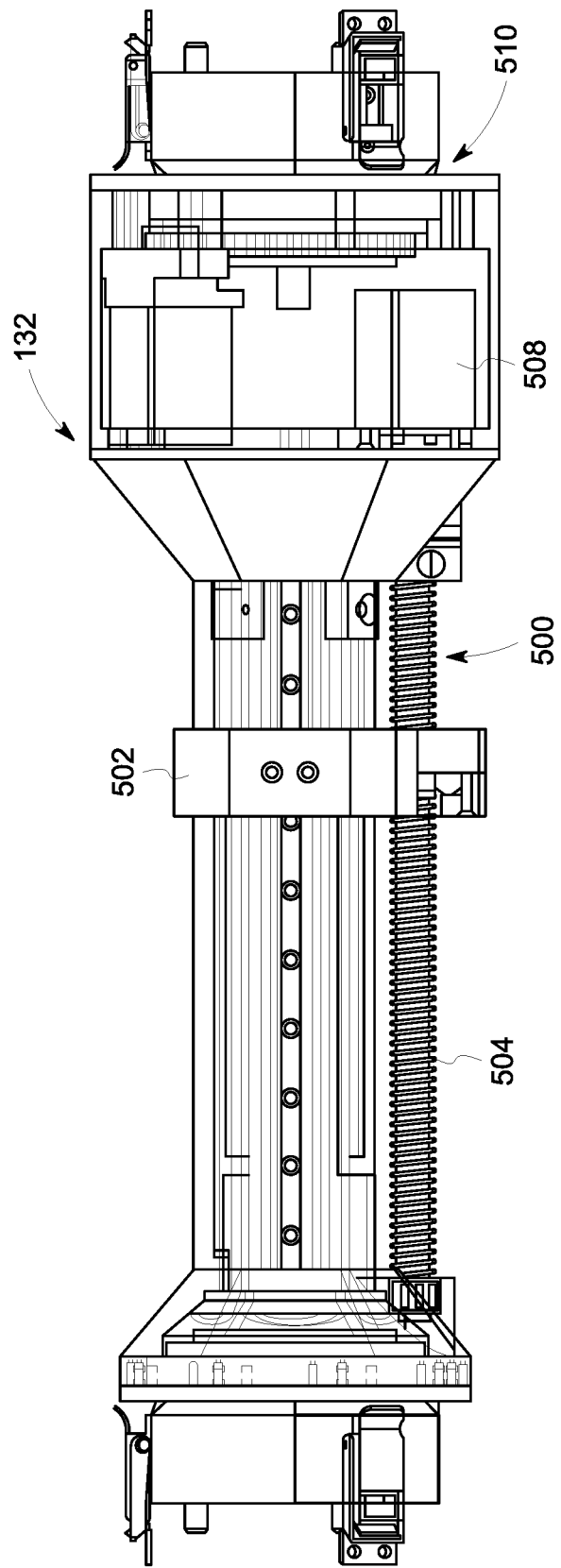
FIG. 6 is a perspective view of a maintenance device actuator for use with the motorized apparatus shown in FIGS. 1 and 5, with an external housing of the maintenance device actuator made transparent to illustrate internal components.
Figure 7:
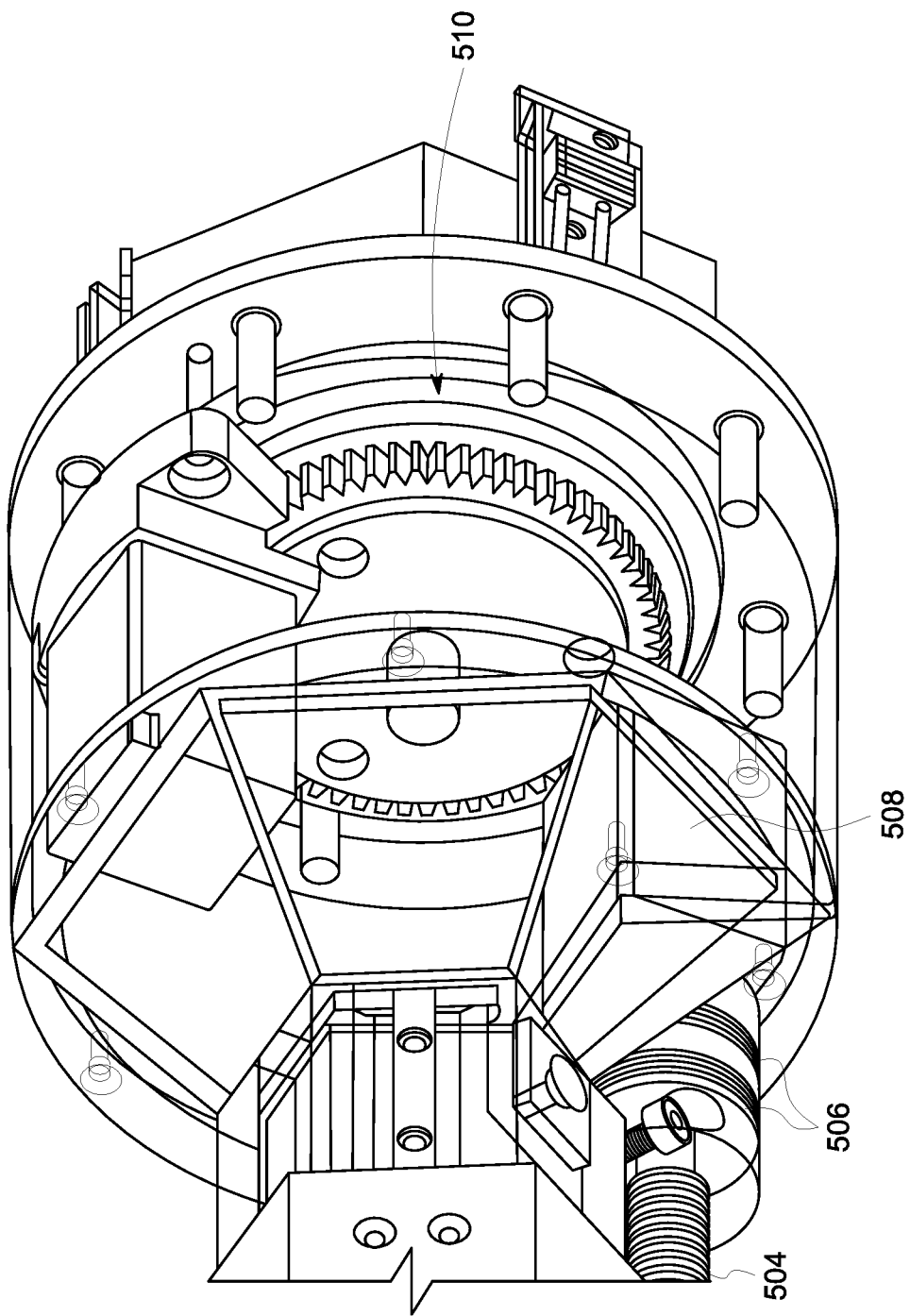
FIG. 7 is an enlarged perspective view of a portion of the maintenance device actuator shown in FIG. 6.

A maintenance device actuator 132 is coupled to body assembly 112 and maintenance device 120, and is operable to move maintenance device 120 translationally along body assembly 112 and/or to rotate maintenance device 120 around body assembly 112. For example, in an embodiment shown in FIGS. 6 and 7, maintenance device actuator 132 includes a screw drive 500 coupled to a carriage 502. Carriage 502 is configured to support maintenance device 120 on body assembly 112. Screw drive 500 includes a threaded member 504, gears 506, and a stepper motor 508. Stepper motor 508 is operable to cause rotation of gears 506 coupled to threaded member 504. Threaded member 504 rotates when gears 506 are rotated. Carriage 502 is threadedly engaged with threaded member 504 and translate longitudinally along threaded member 504 when threaded member 504 rotates. Stepper motor 508 is configured to position carriage 502 along the length of threaded member 504. Stepper motor 508 includes an encoder that provides information relating to a location of carriage 502. In addition, maintenance device actuator 132 includes a rotary actuator 510 coupled to an end of a maintenance device portion and configured to rotate maintenance device 120 and at least a portion of body assembly 112 about an axis. In alternative embodiments, maintenance device 120 includes any maintenance device actuator 132 that enables maintenance device 120 to operate as described herein. In some embodiments, maintenance device actuator 132 is omitted and drive systems 114, leg assemblies 116, and actuator assemblies 118 are used to move maintenance device 120 to a desired position and orientation.

During operation, in some embodiments, maintenance device actuator 132 is used to position maintenance device 120 relative to body assembly 112 and roughly in the proximity of interior surface 108. Leg assemblies 116 are used to precisely position and maintain an orientation of maintenance device 120 relative to interior surface 108 during the maintenance and/or repair operation. In further embodiments, maintenance device 120 is fixedly mounted to body assembly 112, and maintenance device 120 does not include maintenance device actuator 132. Maintenance device 120 does not require a separate actuator coupled directly to or incorporated into maintenance device 120 because leg assemblies 116 are used to control the position and orientation of maintenance device 120 relative to interior surface 108.

In the example embodiment, maintenance device 120 includes at least one sensor and at least one repair tool. For example, maintenance device 120 includes a laser ablation tool 134, a plurality of depth sensors 136, and a laser cladding head 138. In alternative embodiments, maintenance device 120 includes any device that enables maintenance device 120 to operate as described herein. For example, in some embodiments, maintenance device 120 includes, without limitation, any of the following: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, maintenance device 120 is used to provide information for steering motorized apparatus 102 and/or to perform a service operation. For example, a service operation can include an inspection operation, a maintenance operation, and/or a repair operation.

Moreover, in the example embodiment, motorized apparatus 102 includes at least one nozzle 140. For example, nozzles 140 are coupled to body assembly 112 adjacent maintenance device 120. Nozzles 140 are configured to provide a forming gas for controlling the atmosphere at the worksite. In addition, nozzles 140 are configured to continually remove debris before, during, and/or after a service operation is performed. Moreover, in some embodiments, nozzles 140 are configured to direct debris through interior cavity 104 as motorized apparatus 102 travels through interior cavity 104. In the example embodiment, nozzles 140 are oriented to face at least partly radially outward from body assembly 112 and toward surface 108. Leg assemblies 116 are actuated to control the position of nozzles 140 relative to surface 108. In alternative embodiments, motorized apparatus 102 includes any nozzle 140 that enables motorized apparatus 102 to operate as described herein.

In addition, in some embodiments, motorized apparatus 102 includes a light source (not shown) configured to illuminate at least a portion of interior cavity 104 to facilitate steering of motorized apparatus 102 and/or to allow maintenance device 120 to capture images. The light source may be coupled to body assembly 112 and, in some embodiments, may be positionable relative to body assembly 112. In alternative embodiments, motorized apparatus 102 includes any light source that enables motorized apparatus 102 to operate as described herein.

Figure 3:
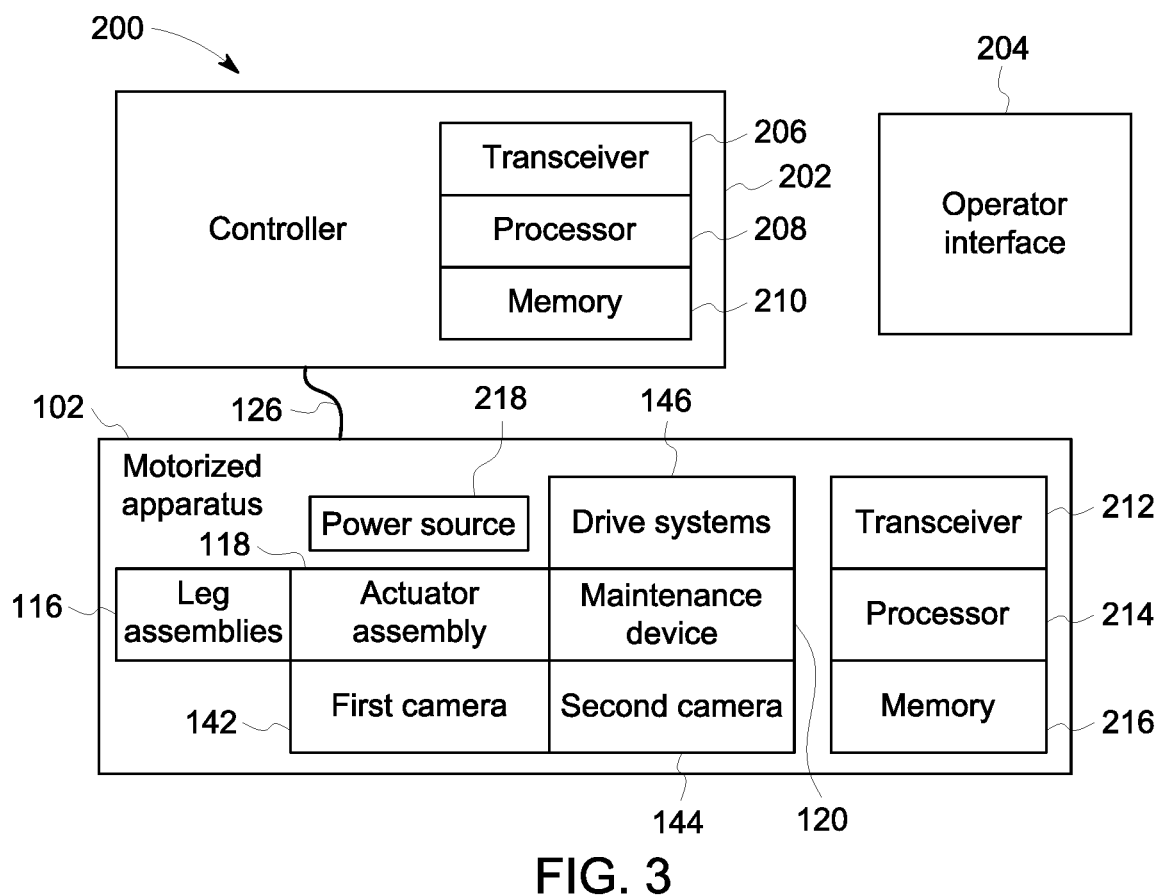
FIG. 3 is a block diagram of a system for use in maintaining the pipe shown in FIGS. 1 and 2.

FIG. 3 is a block diagram of a system 200 for use in maintaining pipe 100 (shown in FIG. 1). System 200 includes motorized apparatus 102, a controller 202, and an operator interface 204. Motorized apparatus 102 includes maintenance device 120, at least one camera 142, 144, and drive systems 146. In alternative embodiments, system 200 includes any component that enables system 200 to operate as described herein. For example, in some embodiments, cameras 142, 144 are omitted. In further embodiments, operator interface 204 is omitted.

Also, in the example embodiment, first camera 142 is mounted to body assembly 112 and configured to provide information for driving motorized apparatus 102. For example, first camera 142 provides a live stream of the environment surrounding motorized apparatus 102. Second camera 144 is mounted to body assembly 112 adjacent maintenance device 120 and is configured to provide images of interior surface 108 (shown in FIG. 1) for use in performing a service operation. First camera 142 and/or second camera 144 may be positionable relative to body assembly 112. In alternative embodiments, system 200 includes any camera 142, 144 that enables system 200 to operate as described herein.

In addition, in the example embodiment, controller 202 includes a transceiver 206, a processor 208, and a memory 210. In some embodiments, controller 202 is positioned remotely from motorized apparatus 102, e.g., controller 202 is located at a base station that enables an operator on an exterior of pipe 100 (shown in FIG. 1) to interact with motorized apparatus 102. Transceiver 206 is communicatively coupled with motorized apparatus 102 and is configured to send information to and receive information from a transceiver 212 of motorized apparatus 102. In some embodiments, transceiver 206 and transceiver 212 communicate wirelessly. In alternative embodiments, motorized apparatus 102 and controller 202 communicate in any manner that enables system 200 to operate as described herein. For example, in some embodiments, controller 202 and motorized apparatus 102 exchange information through a wired link extending between motorized apparatus 102 and controller 202.

In some embodiments, controller 202 includes a mapping interface configured to generate a map of interior cavity 104 of pipe 100 (shown in FIG. 1) around motorized apparatus 102 based on information received from maintenance device 120.

Controller 202 is communicatively coupled to motorized apparatus 102 and is configured to receive information from at least one sensor (e.g., first camera 142 and second camera 144) relating to the position of maintenance device 120 relative to a surface. Controller 202 determines a desired orientation of maintenance device 120 for a service operation. For example, the desired orientation may be determined at least in part based on information stored in memory 210 and/or operator inputs.

Controller 202 compares the desired orientation of maintenance device 120 to a detected orientation of maintenance device 120, which is determined at least in part based on information received from the sensors. Controller 202 determines a difference based on the comparison of the desired orientation and the detected orientation and generates an instruction set based on the determined difference between the desired orientation and the detected orientation. Controller 202 communicates the instruction set to at least one actuator assembly 118 to cause actuator assembly 118 to individually actuate leg assemblies 116 such that maintenance device 120 is moved to the desired orientation.

In addition, in the example embodiment, motorized apparatus 102 includes a processor 214 and a memory 216. Processor 214 is configured to execute instructions for controlling components of motorized apparatus 102, such as maintenance device 120, drive systems 146, and actuator assemblies 118. In alternative embodiments, motorized apparatus 102 includes any processor 214 that enables system 200 to operate as described herein. In some embodiments, processor 214 is omitted.

In some embodiments, maintenance device 120 includes one or more sensors and/or repair tools or pipe maintenance devices. For example, in the example embodiment, maintenance device 120 includes a repair tool configured to repair interior surface 108 (shown in FIG. 1), or an inspection tool configured to inspect a portion of the interior cavity 104.

Also, in the example embodiment, operator interface 204 is configured to display information relating to the characteristics detected by motorized apparatus 102 for interpretation by the operator. Operator interface 204 may be included on a remote computing device (not shown) and/or may be incorporated with controller 202. Operator interface 204 may include, among other possibilities, a web browser and/or a client application. For example, in some embodiments, operator interface 204 displays images of interior surface 108 based on received signals. In some embodiments, operator interface 204 allows an operator to input and/or view information relating to control of motorized apparatus 102. In the example embodiment, operator interface 204 is configured to display information relating to the state of one or more of maintenance device 120 and a power source 218 for interpretation by the operator. For example, state information may include the position of motorized apparatus 102 along a length of pipe 100 (shown in FIG. 1) and/or a position or orientation of maintenance device 120 relative to a surface. State information may also include a charge status of power source 218 and/or a current draw on the various drive and positioning motors. Processor 208 translates operator inputs into steering, tool motion, camera control, sensor control, sensor motion, and/or any other commands and sends information via transceiver 206 to motorized apparatus 102 via transceiver 212. In some embodiments, operator control of motorized apparatus 102 is in real time, such as through a joystick, keyboard, touchscreen, a remote motion capture system, and a wearable motion capture system or other interface having similar function. In other embodiments, motorized apparatus 102 is controlled partially or wholly according to a pre-programmed routine. In further embodiments, motorized apparatus 102 is at least partially automated. In some embodiments, an operator inputs information such as operation goals or conditional directions. In further embodiments, information, such as information received by controller 202 from motorized apparatus 102, control data sent to motorized apparatus 102, and additional operator inputs or state information (e.g., location, time, orientation, datalink quality, battery levels, repair material levels, failure mode indicators), is logged into memory 216 and/or memory 210.

Moreover, in the example embodiment, controller 202 is positioned on the exterior of pipe 100 (shown in FIG. 1) and communicates with motorized apparatus 102 positioned within interior cavity 104 (shown in FIG. 1) of pipe 100 (shown in FIG. 1). For example, controller 202 is configured to send information to motorized apparatus 102 relating to the propulsion and/or steering of motorized apparatus 102 while motorized apparatus 102 is moving within interior cavity 104 (shown in FIG. 1) of pipe 100 (shown in FIG. 1) through a wireless connection and/or tether 126 (shown in FIG. 1). In alternative embodiments, controller 202 and motorized apparatus 102 are configured in any manner that enables system 200 to operate as described herein.

Figure 4:
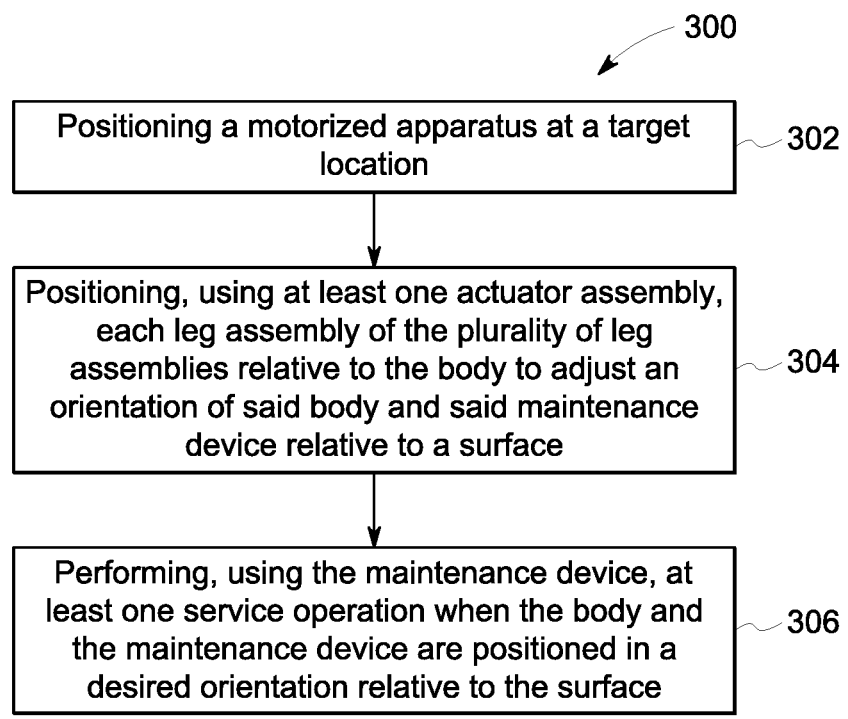
FIG. 4 is a flow chart of an example method of performing a service operation using the motorized apparatus shown in FIG. 1.
Figure 5:
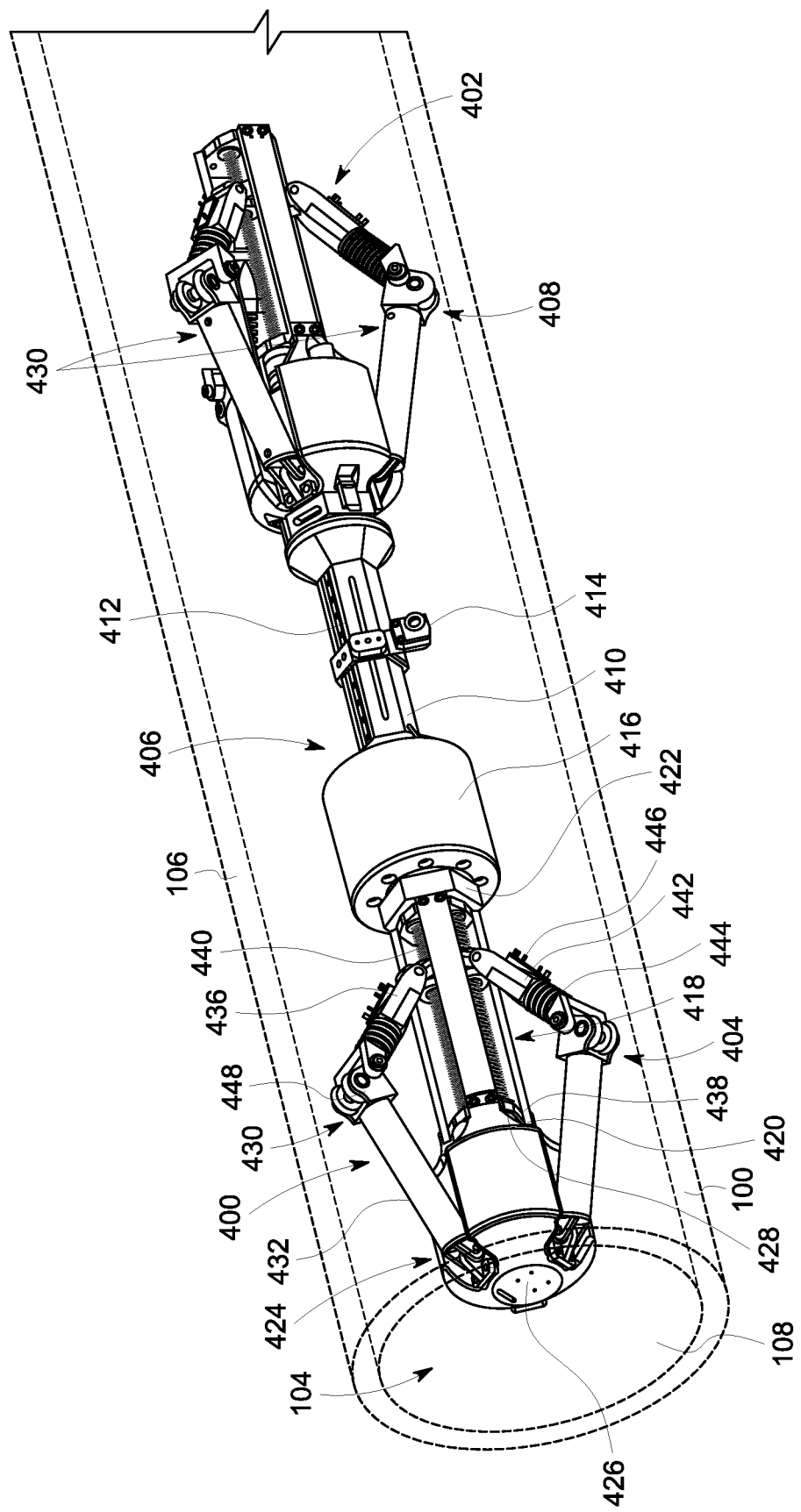
FIG. 5 is a perspective view of an example embodiment of a motorized apparatus including a plurality of leg assemblies traveling through an interior cavity of a pipe.

FIG. 4 is a flow chart of an exemplary method 300 of performing a service operation for a structure such as pipe 100 (shown in FIG. 1). In reference to FIGS. 1-3, method 300 includes positioning 302 motorized apparatus 102 at a target location. For example, motorized apparatus 102 is positioned within pipe 100, driven to a target location, and parked at the target location. For example, in some embodiments, motors of drive systems 146 are configured to rotate wheels 124 to drive motorized apparatus 102 through interior cavity 104. The rotation of wheels 124 is stopped at the target location and, in some embodiments, motorized apparatus 102 parks by positioning leg assemblies 116 such that an increased force is provided on interior surface 108 from leg assemblies 116.

In some embodiments, motorized apparatus 102 detects characteristics of pipe 100 around motorized apparatus 102 when motorized apparatus 102 is parked within interior cavity 104. For example, in some embodiments, a map is generated of interior surface 108 around motorized apparatus 102 when motorized apparatus 102 is parked at a location along pipe 100. After the map is generated, motorized apparatus 102 is able to perform a service operation on interior surface 108 based on information from the map. Accordingly, motorized apparatus 102 is able to operate even if sensors are unable to provide information during a service operation.

Method 300 includes positioning 304, using at least one actuator assembly 118, each leg assembly 116 relative to body assembly 112 to adjust an orientation of body assembly 112 and said maintenance device 120 relative to surface 108. For example, actuator assemblies 118 adjust the position of leg assemblies 116 relative to body assembly 112 such that leg assemblies 116 contact sidewall 106 and provide a predetermined force on sidewall 106. In addition, actuator assemblies 118 adjust the angle, pitch, and yaw of body assembly 112 by independently actuating each of leg assemblies 116. In some embodiments, method 300 includes moving, using maintenance device actuator 132, maintenance device 120 relative to body assembly 112 along the longitudinal axis 122 of body assembly 112 and rotating, using maintenance device actuator 132, maintenance device 120 about longitudinal axis 122. Maintenance device actuator 132 is configured to locate maintenance device 120 relative to body assembly 112 roughly in the area of a target location. Actuator assemblies 118 are configured to individually actuate leg assemblies 116 to precisely position and orient maintenance device 120 and maintain the orientation of maintenance device 120 during a service operation.

In some embodiments, method 300 includes detecting an orientation of the maintenance device relative to the surface and determining instructions for actuator assemblies 118 based on the detected orientation. For example, controller 202 determines the desired orientation of the maintenance device for the service operation, compares the desired orientation of maintenance device 120 to the detected orientation of maintenance device 120, and determines a difference based on the comparison of the desired orientation and the detected orientation. Controller 202 generates an instruction set based on the determined difference between the desired orientation and the detected orientation and communicates the instruction set to actuator assembly 118 to cause actuator assembly 118 to individually actuate leg assemblies 116 such that maintenance device 120 is moved to the desired orientation.

Moreover, method 300 includes performing 306, using maintenance device 120, at least one service operation when body assembly 112 is in a desired orientation relative to surface 108. For example, service operations include maintenance operations, inspection operations, and/or repair operations. In some embodiments, controller 202 continually evaluates the position and orientation of maintenance device 120 during the service operation and generates real time instructions for actuator assemblies 118 to maintain the maintenance device 120 in position and/or continually adjust maintenance device 120 in multiple positions for performing the service operation. For example, in some embodiments, controller 202 determines a path for maintenance device 120 to follow during the service operation and generates instructions for actuator assemblies 118 according to the determined path.

In some embodiments, method 300 includes transmitting signals between motorized apparatus 102 and controller 202 through tether 126 coupled to motorized apparatus 102. Tether 126 extends from motorized apparatus 102 to an exterior of pipe 100. Accordingly, tether 126 allows motorized apparatus 102 to send and receive signals from controller 202 on an exterior of pipe 100. For example, in some embodiments, motorized apparatus 102 receives power via tether 126. In further embodiments, signals are transmitted through tether 126 with instructions for driving and operating motorized apparatus 102. In addition, controller 202 can send instructions through tether 126 for actuator assemblies 118 to actuate leg assemblies 116. Accordingly, tether 126 allows motorized apparatus 102 to have a compact size because components exterior of motorized apparatus 102 can communicate and provide signals to tether 126.

FIG. 4 is a perspective view of an example embodiment of a motorized apparatus 400 traveling through interior cavity 104 of pipe 100. Motorized apparatus 400 includes a body assembly 402 sized to fit within interior cavity 104. Body assembly 402 is modular and includes a plurality of portions that are detachably coupled together. Specifically, body assembly 402 includes a first drive portion 404, a maintenance device portion 406, and a second drive portion 408. In alternative embodiments, body assembly 402 includes any portions that enable motorized apparatus 400 to operate as described herein.

In the example embodiment, first drive portion 404 and second drive portion 408 are coupled to opposite ends of maintenance device portion 406. Portions 404, 406, 408 are coupled together in any suitable manner. For example, in some embodiments, portions 404, 406, 408 include clips that are engaged when portions 404, 406, 408 are coupled together. In some embodiments, the connections between portions 404, 406, 408 include draw latches with locating pins. In alternative embodiments, motorized apparatus 400 includes any coupling device that enables motorized apparatus 400 to operate as described herein.

As a result, motorized apparatus 400 is adaptable for different service operations using various devices and/or portions. In addition, motorized apparatus 400 fits through smaller openings because motorized apparatus 400 includes portions 404, 406, 408. In some embodiments, portions 404, 406, 408 of motorized apparatus 400 are able to be individually positioned through the opening and then coupled together within interior cavity 104 (shown in FIG. 1). Moreover, motorized apparatus 400 allows for simpler removal and replacement of components of motorized apparatus 400.

Maintenance device portion 406 includes a maintenance body 410. Maintenance body 410 forms a portion of body assembly 402 when maintenance device portion 406 is coupled to at least one other portion 404, 406, 408. Maintenance body 410 includes an axial track 412. In addition, in the example embodiment, at least one maintenance device 414 is coupled to maintenance body 410 and is configured to move along maintenance body 410 of device portion 406. Specifically, maintenance device 414 moves along axial track 412 of maintenance body 410. Device portion 406 includes a maintenance actuator assembly 416 configured to position maintenance device 414 relative to maintenance body 410. In alternative embodiments, maintenance device portion 406 includes any maintenance body 410 that enables motorized apparatus 400 to operate as described herein.

In the example embodiment, drive portions 404, 408 are identical and are able to couple to either end of maintenance device portion 406 (shown in FIG. 10) and/or to each other. Accordingly, drive portions 404, 408 are interchangeable and are able to be removed and, if necessary, replaced. Drive portions 404, 408 include drive systems configured to propel motorized apparatus 400 through interior cavity 104 of pipe 100. For example, drive mechanisms such as wheels interact with sidewall 106 and are driven by one or more motors to propel motorized apparatus 400 along pipe 100.

Also, in the example embodiment, each drive portion 404, 406 includes a support 418 including a support first end 420 and support second end 422, and a housing 424 including a housing first end 426 and a housing second end 428. Support first end 420 is coupled to housing second end 428.

Moreover, in the example embodiment, each drive portion 404, 406 includes a plurality of leg assemblies 430. Leg assemblies 430 include a first leg portion 432 rotatably coupled to housing 424, and a second leg portion 436 moveably coupled to second end 422 of support 418. First leg portion 432 and second leg portion 436 are rotatably coupled together at joint 448. Leg assemblies 430 are positioned circumferentially around support 418.

In the example embodiment, motorized apparatus 400 includes at least three leg assemblies 430 coupled to each drive portion 404, 408. Each leg assembly 430 is independently actuated and antagonistically positioned to maintain a constant contact force against the sidewall 106. Motorized apparatus 400 is able to tilt and shift relative to the axis of pipe 100 by controlling the position of leg assemblies 430. Moreover, motorized apparatus 400 is able to position and orient maintenance device 414 relative to interior surface 108 by controlling the position of leg assemblies 430. For example, motorized apparatus 400 can move maintenance device 414 in at least three directions using leg assemblies 430 without the use of any actuators directly coupled to or integrated with maintenance device 414. In alternative embodiments, motorized apparatus 400 includes any leg assemblies 430 that enable motorized apparatus 400 to operate as described herein.

In addition, in the example embodiment, each drive portion 404, 406 includes at least one actuator assembly 438 configured to independently position second leg portions 436 of leg assemblies 430 relative to support 418. In the example embodiment, each leg assembly 430 is positioned relative to support 418 by rotating a screw drive 440 engaged with the respective second leg portion 436. In the example embodiment, actuator assembly 438 is housed in housing 424. In alternative embodiments, drive portion 404, 406 includes any actuator assembly 438 that enables motorized apparatus 400 to operate as described herein.

Moreover, in the example embodiment, second leg portion 436 includes a telescoping portion 442 and a bias member 444. In the example embodiment, bias member 444 is a spring. In other embodiments, bias member 444 may be another device able to store potential energy. Devices able to store potential energy may incorporate a piston, a plunger, or one or more magnets. Telescoping portion 442 is rotatably coupled to first leg portion 432 of leg assembly 430 at joint 448. In the example embodiment, an elongate portion of telescoping portion 442 is housed within bias member 444 and an outer portion of telescoping portion 442 is positioned adjacent bias member 444 and slidably receives the elongate portion within an interior cavity. Bias member 444 exerts a force against telescoping portion 442 in a direction substantially away from second end 422 of support 418. The force of bias member 444 against telescoping portion 442 biases leg assemblies 430 in a radially outward position. In alternative embodiments, second leg portion 436 is configured to move in any manner that enables leg assemblies 430 to function as described herein.

In addition, in the example embodiment, motorized apparatus 102 includes at least one sensor assembly 446. In the example embodiment, sensor assembly 446 is configured to collect data associated with a position and orientation of maintenance device 120 relative to the sidewall. For example, in some embodiments, sensor assembly 446 includes a camera or other optical sensor. In the example embodiment, each leg assembly 430 includes a sensor assembly 446 configured to detect information relating to a displacement of leg assemblies 430. The position and orientation of maintenance device 120 may be determined based at least in part on the displacements of leg assemblies 430. For example, sensor assembly 446 includes a linear position sensor that detects the position of telescoping portions 442 of second leg portions 436 relative to each other. In addition, motorized apparatus 400 provides closed loop controls of positioning of motorized apparatus 400 (e.g., self-centering or station keeping functions). Moreover, motorized apparatus 400 reduces positional drift, unrecoverable falling, and the required number of contact points of motorized apparatus 400. Also, motorized apparatus 400 is able to have a reduced size and detect potential slippage of drive mechanisms on sidewall 106 because motorized apparatus 400 is able to monitor the force of leg assemblies on sidewall 106.

Moreover, in the example embodiment, each leg assembly 430 includes a joint 448 rotatably coupling first leg portion 432 to second leg portion 436. For example, joints 448 include pins and bearings that engage the ends of first leg portions 432 and second leg portions 436 opposite body assembly 402. Joints 448 define an outermost radius of motorized apparatus 400. Moreover, joints 448 are configured to move radially relative to the longitudinal axis of motorized apparatus 400 when leg assemblies 430 are actuated. In alternative embodiments, leg assemblies 430 include any joints that enable motorized apparatus 400 to operate as described herein.

Embodiments described herein provide motorized apparatus and systems that are useful for maintenance and inspection in a variety of applications. For example, some embodiments are used to maintain steam pipes and include a steam pipe weld repair system. In some embodiments, the steam pipe weld repair system is manually controlled. In further embodiments, the system is at least partly automated. Sensor data and operator inputs, including the selection and rejection of regions to repair will be logged and used to refine algorithms to improve automated performance, reducing operator workload with use.

Embodiments of the motorized apparatus are able to move with protected sensing and maintenance equipment through steam pipes that can range from 6 to 36 inches in diameter with, for example, wall temperatures of 350° F. and an ambient atmosphere that is 250° F. with 100% relative humidity. The motorized apparatus adapts to variable pipe diameters using actuated leg assemblies. The actuated leg assemblies keep the motorized apparatus centered radially in the pipe. In addition, the motorized apparatus enable the maintenance device to undertake linear travel that is twice the diameter of the pipe.

In addition, in some embodiments, a driven wheel is used to contact the pipe's inner wall. In some embodiments, the friction surface of each wheel is high temperature silicone, which has an operating temperature of over 550° F. and has desirable high friction and low thermal conductivity, which helps thermally isolate the motorized apparatus from the hot pipe's inner walls. Neodymium magnet motors may be used throughout the robotic motorized apparatus, including for the drive wheels, motion pod linkage actuators, and a maintenance device positioning system. Neodymium magnets have a Curie temperature of 589° F., allowing properly sized motors to perform well in relatively high temperature environments without additional cooling.

The arrangement of motion pods in the forward and aft positions of the robotic motorized apparatus allows the motorized apparatus to both push and pull itself through terrain such as expansion joints and diameter reducing couplings. Antagonistically positioned drive wheels allow the motorized apparatus to increase motorized apparatus traction as necessary by pressing harder against the inner wall of the pipe while driving, ensuring that the motorized apparatus can pull at least 500 feet worth of tether without increasing the weight of the motorized apparatus. The motorized apparatus utilizes actuator force, not motorized apparatus weight, to increase traction.

Because the maintenance device may rotate around an axial track and the direction of gravity relative to the motorized apparatus may be sensed and used to rotate sensor data, there is no preferred roll orientation for the motorized apparatus and therefore there is no need for complicated steering mechanisms on the motorized apparatus to re-orient the motorized apparatus as it traverses pipe sections.

The maintenance device carries sensors and tools required to perform buildup repairs when the motorized apparatus is stationary relative to the pipe and provides a fixed frame of reference for control. For example, in some embodiments, the maintenance device includes an ablation laser processing head for cleaning, a forming gas nozzle for controlling the atmosphere at the worksite, a laser processing head for cladding buildup repairs, a suction nozzle to continually remove debris as debris is created, and an array of depth sensors. The full repair tool module of the maintenance device is mounted to a platform and the maintenance device including individually actuated legs allows the tool to have at least three degrees of freedom. Distributing the repair tools radially around the module allows for positioning each tool relative to the work site by knowing the fixed angular offset between each tool and the depth scanning system. The individual inspection and repair tools are mounted a fixed distance away from the center of rotation so that the nominal working distance from each sensor or tool to the work piece may be maintained. This standoff distance can be manually adjusted to accommodate repairs to different pipe diameters.

In some embodiments, the motorized apparatus takes advantage of a gaseous cooling system to ensure electronics are maintained at operational temperatures. The cooling gas also serves as forming gas for the laser processing system and is dispensed through a nozzle to the repair site after circulating through specific regions of the robot's body and maintenance device to provide targeted cooling for electronics. In some embodiments, a metallic additive manufacturing process is used to provide a housing that protects consumer grade electronics in environments up to 700° F. using air cooling and up to 3000° F. using fluid (e.g., air or water) cooling.

A multi-function tether carries the cooling/forming gas to the motorized apparatus along with communications and power transmission. For example, in some embodiments, power is supplied for the maintenance device through two fiber optic cables and electrical power is transmitted through conductors inside of the tether. Welding wire will be fed through a dedicated channel and communications will be performed using standard Ethernet technologies. A vacuum channel will serve as a return path for collected debris allowing for longer operations than would be possible if debris were collected inside of the motorized apparatus. As a result, the tether allows the motorized apparatus to carry less components and have a reduced weight.

In some embodiments, the motorized apparatus is equipped with two types of sensors: visual sensors and depth sensors. A situational awareness camera may be mounted inside a cooled chamber of an aft motion housing, looking in the axially forward direction. From this position, this sensor will allow the operator to visualize the pipe section that the maintenance device has access to as well as to monitor the motions of the maintenance device during a repair operation. In at least some embodiments, it will be known how far into the pipe the repair site is located before the motorized apparatus enters a pipe to perform repairs. The operator can then drive the motorized apparatus quickly to a distance that is just short of the expected repair site, estimating distance by dispensed tether length, and then drive forward slowly while watching the feed from this situational awareness camera to park the motorized apparatus so that the repair site is within the field of regard of the maintenance device.

In some embodiments, the maintenance device carries an array of depth sensors that are housed in cooled cavities. By rotating around and traversing along the axis of the axial track, the array of depth sensors will collect a complete point cloud model of the inside surface of the pipe in coordinates that are fixed to the robot, which is stationary relative to the pipe. This fixed coordinate system, tied through the motorized apparatus to the pipe, allows the motorized apparatus to know its surroundings blindly, making the motorized apparatus robust to challenges such as fogged over lenses. In some embodiments, a process monitoring visual camera is mounted to the laser processing head to allow for visual feedback. Optical windows in front of each camera may be equipped with heaters to minimize fogging. Inertial measurement units mounted inside of cooled housings that are rigidly oriented relative to all sensors allow the motorized apparatus to measure the direction of gravity and therefore establish the orientation of collected data. Once a comprehensive set of depth data has been collected over the field of regard of the maintenance device, the point cloud may be processed into a surface model using a tessellation algorithm. In parallel, a cylindrical surface may be fit to the point cloud with greater weight applied during the fit to points farthest away from the pipe's bottom dead center. Comparing the tessellated, as measured surface model, to the idealized cylindrical surface model, the system may calculate a volumetric region for cladding buildup in fixed robot coordinates. This model may be analyzed and automatically tapered at the forward and aft boundaries of the maintenance device's field of regard to ensure that smooth transitions between the original pipe and built up regions are realized. Additionally, this facilitates a taper between repairs if the motorized apparatus must be moved to address long repair sites.

In some embodiments, laser cleaning and welding of pipes creates high strength repairs. Dispensing forming gas and suctioning debris during cleaning (center frame) removes debris as the repair site is both cleaned and repairs are made. In further embodiments, the motorized apparatus utilizes laser ablation to clean the repair site. For example, some laser ablation systems include a nanosecond scale pulsed laser and a galvanometer scanner to steer the ablating laser beam. The laser ablation system are sized to be incorporated into the maintenance device. In some embodiments, some components of the laser ablation system are located remote from the motorized apparatus such as at a base station of the motorized apparatus.

Following the completion of a cladding repair, the scanning and mapping systems may collect and produce another depth map of the repair site and the laser ablation system may be used to perform any final cleanup if necessary.

In some embodiments, motorized apparatus 102 is used to perform a service operation for pipe 100, such as a repair of interior surface 108. An example repair sequence includes the following steps:

1. Recognize a need for maintenance over a given stretch of pipe using an independent inspection approach and distance to the repair site from the access port.
2. Prepare an access port by opening the access point and ensuring that the pipe walls are no warmer than 350° F.
3. Maintenance system (Motorized apparatus and base station) are delivered to access site.
4. Motorized apparatus is powered up, consumables are loaded, and system readiness checks are performed.
5. Motorized apparatus is inserted into the prepared access port.
6. Motorized apparatus is commanded to travel a distance that is just shy of the expected repair site.
7. Inspection system configured to scan pipe walls while motorized apparatus drives into pipe with intention of locating pre-identified areas in need of repair.
8. When an area in need of repair is located, motorized apparatus position is tuned to ensure region in need of repair falls within the field of regard of the repair tool.
9. Operator verifies motorized apparatus position relative to repair area by looking at sensor data displayed on base station.
10. Motorized apparatus parks at the selected location relative to the pipe and region in need of repair.
11. Inspection system performs a detailed scan (including depth) of the workspace, with sensed information traceable back to the location of the motorized apparatus relative to the pipe.
12. Operator reviews workspace scan and selects/confirms regions for surface preparation.
13. Repair tool is positioned at a desired orientation using independently actuated legs to position the repair tool precisely relative to selected regions for buildup repair.
14. Laser ablation system cleans surface to be repaired while debris management system removes loosened material.
15. Inspection system performs detailed scan (including depth) of prepared surfaces.
16. Operator selects/confirms locations of specific sites to perform repairs (all relative to motorized apparatus's frame of reference which is firmly fixed to the pipe because the motorized apparatus is parked).
17. Toolpath generated for repair tool to perform buildup repair based on captured 3D model and operator inputs.
18. Operator reviews toolpath and accepts or returns to step 15 for refinement.
19. Repair tool follows toolpath by independently actuating legs to control position and orientation of tool. It is possible to perform the operation with little or no visual feedback because tool is controlled relative to the motorized apparatus's frame of reference and that is fixed to the pipe.
20. Inspection system performs detailed scan (including depth) of built-up surfaces.
21. System analyzes generated 3D map and generates recommendation for rework or repair completion.
22. Operator reviews system recommendation and returns to step 16 or proceeds.
23. Cleaning tool performs final cleanup of entire reachable area.
24. If more repairs are needed, return to step 6, otherwise, motorized apparatus backs out of pipe, maintenance system is removed, and pipe is returned to service.

An example technical effect of the methods, systems, and apparatus described herein includes at least one of: (a) reducing the time to inspect and/or repair pipes; (b) enabling inspection and repair of an interior cavity of a pipe at greater distances from an access opening; (c) increasing the information that is available during a service operation of an interior cavity of a pipe; (d) providing an apparatus configured to withstand relatively high temperatures and pressures within a pipe; (e) providing an apparatus that is configured to fit within a range of pipe sizes and traverse different transitions; (f) providing precise positioning of a maintenance device within a pipe; (g) reducing the number of actuators that are required on a maintenance apparatus to precisely position the maintenance device; and (h) simplifying the assembly and operation of motorized apparatus used for service operations.

Example embodiments of systems and methods for use in maintaining pipes are described above in detail. The methods and systems are not limited to the specific embodiments described herein, but rather, components of systems and/or steps of the methods may be utilized independently and separately from other components and/or steps described herein. For example, the method may also be used in combination with other components, and are not limited to practice only with the pipes as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A motorized apparatus comprising:
    a body assembly;
    a maintenance device mounted to said body assembly and configured to perform a service operation on a surface, said maintenance device extending from said body assembly at an angle;
    a plurality of leg assemblies coupled to said body assembly and configured to support said body assembly and said maintenance device at a distance from the surface; and
    a plurality of actuator assemblies comprising a plurality of screw drives coupled to said plurality of leg assemblies and configured to rotate to independently actuate each said leg assembly of said plurality of leg assemblies, wherein said plurality of actuator assemblies are configured to receive instructions related to a position of said maintenance device and actuate said plurality of leg assemblies to adjust an orientation of said body assembly and said maintenance device relative to the surface.

2. The motorized apparatus in accordance with claim 1, wherein each said leg assembly of said plurality of leg assemblies further comprises a drive mechanism configured to contact a wall.

3. The motorized apparatus in accordance with claim 1, further comprising at least one sensor configured to detect a position of said maintenance device relative to the surface, wherein the instructions for said plurality of actuator assemblies are determined based on information acquired by said at least one sensor.

4. The motorized apparatus in accordance with claim 1, wherein said plurality of actuator assemblies are configured to actuate each said leg assembly of said plurality of leg assemblies to adjust the orientation of said body assembly and said maintenance device in at least three directions relative to the surface.

5. The motorized apparatus in accordance with claim 1, wherein said maintenance device includes a laser ablation tool, a plurality of depth sensors, and a laser cladding head.

6. The motorized apparatus in accordance with claim 1, wherein said maintenance device includes at least one tool of the following tools: an applicator, a drill, a grinder, a heater, a welding electrode, a sprayer, an optical sensor, a mechanical sensor, a thermal sensor, a magnetic sensor, an acoustic sensor, and an electromagnetic sensor.

7. The motorized apparatus in accordance with claim 1 further comprising a maintenance device actuator coupled to the body assembly, the maintenance device actuator comprising a carriage configured to support the maintenance device, wherein the carriage is threadingly engaged with a screw drive of the plurality of screw drives and is configured to translate longitudinally along the screw drive as the screw drive rotates.

8. The motorized apparatus in accordance with claim 7, wherein the maintenance device actuator further comprises a stepper motor configured to position the carriage at a desired location along the screw drive.

9. The motorized apparatus in accordance with claim 8, wherein the stepper motor further comprises at least one sensor configured to detect a position of the carriage along the screw drive, and wherein instructions for the maintenance device actuator are determined based on information acquired by said at least one sensor.

10. A system comprising:
    a motorized apparatus comprising:
        a body assembly;
        a maintenance device mounted to said body assembly and configured to perform a service operation on a surface;
        a plurality of leg assemblies coupled to said body assembly and configured to support said body assembly and said maintenance device at a distance from the surface; and
        a plurality of actuator assemblies comprising a plurality of screw drives coupled to said plurality of leg assemblies and configured to rotate to independently actuate each said leg assembly of said plurality of leg assemblies;
    at least one sensor configured to detect a position of said motorized apparatus relative to the surface; and
    a controller communicatively coupled to said motorized apparatus and configured to receive information from said at least one sensor relating to the position of said maintenance device relative to the surface, wherein said controller is configured to send instructions to said plurality of actuator assemblies to actuate said plurality of leg assemblies and adjust an orientation of said body assembly and said maintenance device relative to the surface.

11. The system in accordance with claim 10, wherein said controller is further configured to:
    determine a desired orientation of said maintenance device for the service operation;
    compare the desired orientation of said maintenance device to a detected orientation of said maintenance device; and
    determine a difference based on the comparison of the desired orientation and the detected orientation.

12. The system in accordance with claim 11, wherein said controller is further configured to:
    generate an instruction set based on the determined difference between the desired orientation and the detected orientation; and
    communicate the instruction set to said plurality of actuator assemblies comprising the plurality of screw drives to cause said plurality of actuator assemblies to individually actuate said plurality of leg assemblies such that said maintenance device is moved to the desired orientation.

13. The system in accordance with claim 10, wherein each said leg assembly of said plurality of leg assemblies further comprises a drive mechanism configured to contact a wall.

14. The system in accordance with claim 10, further comprising at least one sensor configured to detect a position of said maintenance device relative to the surface, wherein said plurality of actuator assemblies are configured to actuate said plurality of leg assemblies based on information from said at least one sensor.

15. The system in accordance with claim 10, wherein said plurality of actuator assemblies are configured to actuate each said leg assembly of said plurality of leg assemblies to adjust the orientation of said body assembly and said maintenance device in at least three directions relative to the surface.

16. A method for performing a service operation on a surface, said method comprising:
    positioning a motorized apparatus at a target location, the motorized apparatus including:
        a body assembly;
        a maintenance device mounted to the body assembly and configured to perform a service operation at the target location on the surface;
        a plurality of leg assemblies coupled to the body assembly and configured to support the body assembly and the maintenance device at a distance from the surface; and
        a plurality of actuator assemblies including a plurality of screw drives coupled to the plurality of leg assemblies and configured to rotate to independently actuate each leg assembly of the plurality of leg assemblies;
    positioning, using at least one actuator assembly, each leg assembly of the plurality of leg assemblies relative to the body assembly to adjust an orientation of the body assembly and the maintenance device relative to the surface; and
    performing, using the maintenance device, the service operation on the surface when the body assembly and the maintenance device are positioned in a desired orientation relative to the surface.

17. The method in accordance with claim 16 further comprising detecting an orientation of the maintenance device relative to the surface.

18. The method in accordance with claim 17 further comprising:
    determining the desired orientation of the maintenance device for the service operation;
    comparing the desired orientation of the maintenance device to the detected orientation of the maintenance device; and
    determining a difference based on the comparison of the desired orientation and the detected orientation.

19. The method in accordance with claim 18 further comprising:
    generating an instruction set based on the determined difference between the desired orientation and the detected orientation; and
    communicating the instruction set to the plurality of actuator assemblies to cause the plurality of actuator assemblies to individually actuate the plurality of leg assemblies such that the maintenance device is moved to the desired orientation.

20. The method in accordance with claim 16, wherein positioning, using at least one actuator assembly of the plurality of actuator assemblies, each leg assembly of the plurality of leg assemblies relative to the body assembly to adjust an orientation of the body assembly and the maintenance device relative to the surface comprises actuating each leg assembly of the plurality of leg assemblies to adjust the orientation of the body assembly and the maintenance device in at least three directions relative to the surface.

* * * * *